United States Patent
Ahn et al.

(10) Patent No.: US 12,474,882 B2
(45) Date of Patent: Nov. 18, 2025

(54) DISPLAY MODULE COMPRISING A PLURALITY OF SCAN GROUPS, MODULAR DISPLAY APPARATUS AND CONTROL METHOD THEREOF

(71) Applicant: SAMSUNG ELECTRONICS CO., LTD., Suwon-si (KR)

(72) Inventors: Deukgeun Ahn, Suwon-si (KR); Jaehyang Lee, Suwon-si (KR); Hyeokjun Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/391,083

(22) Filed: Dec. 20, 2023

(65) Prior Publication Data
US 2024/0160397 A1 May 16, 2024

Related U.S. Application Data

(63) Continuation of application No. PCT/KR2023/017894, filed on Nov. 8, 2023.

(30) Foreign Application Priority Data

Nov. 11, 2022 (KR) .................. 10-2022-0150150

(51) Int. Cl.
*G06F 3/14* (2006.01)
*G09G 3/32* (2016.01)
*G09G 3/3216* (2016.01)

(52) U.S. Cl.
CPC ............. *G06F 3/1446* (2013.01); *G09G 3/32* (2013.01); *G09G 3/3216* (2013.01);
(Continued)

(58) Field of Classification Search
CPC ........ G06F 3/1446; G06F 3/32; G06F 3/3216; G09G 2300/026; G09G 2310/0213; G09G 2310/08; G09G 2330/021; G09G 2360/12
See application file for complete search history.

(56) References Cited

U.S. PATENT DOCUMENTS

| 8,344,659 B2 | 1/2013 | Shimomura et al. |
| 10,255,857 B2 | 4/2019 | Hyeon et al. |

(Continued)

FOREIGN PATENT DOCUMENTS

| JP | 6827594 B2 | 2/2021 |
| KR | 10-0903822 B1 | 6/2009 |

(Continued)

OTHER PUBLICATIONS

International Search Report dated Feb. 20, 2024 in International Application No. PCT/KR2023/017894.
(Continued)

*Primary Examiner* — Cory A Almeida
(74) *Attorney, Agent, or Firm* — Sughrue Mion, PLLC

(57) ABSTRACT

A modular display apparatus is disclosed. The modular display apparatus includes a plurality of display modules, and a controller configured to control the plurality of display modules, and the plurality of display modules include a plurality of scan groups, respectively, the controller is configured to transmit an image signal corresponding to the respective display modules based on an image frame, and the respective scan groups included in a first display module from among the plurality of display modules includes a plurality of scan lines arranged in one direction, a plurality of data lines arranged in a direction perpendicular to the plurality of scan lines, light emitting diodes generated at a cross area of the scan lines and the data lines, and at least one driver integrated circuit.

17 Claims, 11 Drawing Sheets

(52) U.S. Cl.
CPC ............. *G09G 2300/026* (2013.01); *G09G 2310/0213* (2013.01); *G09G 2310/08* (2013.01); *G09G 2330/021* (2013.01); *G09G 2360/12* (2013.01)

(56) References Cited

U.S. PATENT DOCUMENTS

| | | | |
|---|---|---|---|
| 11,074,852 B2 | 7/2021 | Hyeon | |
| 11,455,946 B2 | 9/2022 | Hyeon | |
| 11,488,548 B2 | 11/2022 | Kim et al. | |
| 2011/0043125 A1 | 2/2011 | Peeters | |
| 2011/0109228 A1 | 5/2011 | Shimomura et al. | |
| 2012/0299480 A1* | 11/2012 | Peting | H05B 45/3725 315/185 R |
| 2015/0186099 A1* | 7/2015 | Hall | G09G 3/2096 345/1.3 |
| 2015/0338911 A1* | 11/2015 | Yamamoto | G06F 1/3296 713/323 |
| 2016/0078802 A1 | 3/2016 | Liang et al. | |
| 2016/0360144 A1 | 12/2016 | Williams et al. | |
| 2017/0069270 A1 | 3/2017 | Hyeon et al. | |
| 2020/0082752 A1 | 3/2020 | Hyeon | |
| 2020/0211446 A1 | 7/2020 | Mays | |
| 2021/0011820 A1* | 1/2021 | Kim | G06F 3/1446 |
| 2021/0225270 A1 | 7/2021 | Hyeon | |
| 2021/0241678 A1 | 8/2021 | Asamura et al. | |
| 2022/0114975 A1 | 4/2022 | Kim et al. | |
| 2023/0028210 A1 | 1/2023 | Kim et al. | |

FOREIGN PATENT DOCUMENTS

| | | |
|---|---|---|
| KR | 10-2010-0136571 A | 12/2010 |
| KR | 10-2017-0028623 A | 3/2017 |
| KR | 10-2017-0114617 A | 10/2017 |
| KR | 10-2018-0032738 A | 4/2018 |
| KR | 10-2019-0006007 A | 1/2019 |
| KR | 10-2020-0028142 A | 3/2020 |
| KR | 10-2022-0047113 A | 4/2022 |
| WO | 2021/236243 A1 | 11/2021 |

OTHER PUBLICATIONS

Written Opinion dated Feb. 20, 2024 in International Application No. PCT/KR2023/017894.

* cited by examiner

DISPLAY MODULE COMPRISING A PLURALITY OF SCAN GROUPS, MODULAR DISPLAY APPARATUS AND CONTROL METHOD THEREOF

CROSS-REFERENCE TO RELATED APPLICATION(S)

This application is a bypass continuation of International Application No. PCT/KR2023/017894, filed on Nov. 8, 2023, which is based on and claims priority to Korean Patent Application No. 10-2022-0150150, filed on Nov. 11, 2022, in the Korean Intellectual Property Office, the disclosures of which are incorporated by reference herein in their entireties.

BACKGROUND

1. Field

The disclosure relates to a display module, a modular display apparatus, and a control method thereof, and more particularly, to a display module including a plurality of scan groups, a modular display apparatus including a plurality of display modules, and a control method thereof.

2. Description of Related Art

With display systems becoming large-scaled and having high-resolutions, display modules that form a display system and a number of display apparatuses are increasing in proportion thereto.

With modular display apparatuses, size and form of the modular display apparatuses may be changed according to a number of display apparatuses, a size of the display apparatus that form the modular display apparatus, and the like.

If pixels included in a display are driven in a passive matrix method, a driver IC for driving a plurality of scan lines and a plurality of data lines may be necessary, and if a number of pixels increase, a number of driver ICs may also increase.

In addition, a number of scan groups may increase according to display apparatuses becoming large-scaled, and with the number of scan groups increasing, a number of pins required at the controller that transmits a PWM signal to a driver IC may also increase according to the number of scan groups increasing.

Because a high-performance controller increases material cost, manufacturing cost, and power consumption, there has been a demand for a method to control the plurality of scan groups included in a large-scale display apparatus which does not necessarily require a high-performance controller in order to reduce material cost and power consumption.

SUMMARY

According to one or more embodiments, a modular display apparatus includes a plurality of display modules, and a controller configured to control the plurality of display modules, and the plurality of display modules include a plurality of scan groups, respectively, the controller is configured to transmit an image signal corresponding to the respective display modules based on an image frame, and the respective scan groups included in a first display module from among the plurality of display modules include a plurality of scan lines arranged in one direction, a plurality of data lines arranged in a direction perpendicular to the plurality of scan lines, light emitting diodes (LEDs) generated at a cross area of the scan lines and the data lines, and at least one driver integrated circuit (IC) configured to provide a scan signal to the plurality of scan lines with a progressive scan method during a time period corresponding to the image frame, and provide the image signal to the data lines corresponding to the scan lines through which the scan signal is provided, and the plurality of scan groups included in the first display module is connected in a daisy chain method.

According to one or more embodiments, a control method of a modular display apparatus formed of a plurality of display modules includes transmitting an image signal corresponding to the plurality of display modules, respectively, based on an image frame by a controller, providing a scan signal to a plurality of scan lines included in a first display module with a progressive scan method during a time period corresponding to the image frame by at least one driver IC, and providing the image signal to data lines corresponding to scan lines through which the scan signal is provided from among a plurality of data lines arranged in a direction perpendicular to the plurality of scan lines by the at least one driver IC, and a plurality of scan groups included in the plurality of display modules, respectively, is connected in a daisy chain method.

According to an aspect of the disclosure, a display apparatus includes: a controller configured to control one or more display modules, wherein the one or more display modules include one or more scan groups, wherein the controller is configured to: provide an image signal corresponding to the one or more display modules based on an image frame, wherein the one or more scan groups included in a first display module from among the one or more display modules, include: one or more scan lines arranged in one direction; one or more data lines arranged in a direction perpendicular to the one or more scan lines; one or more light emitting diodes (LEDs) generated at a cross area of the one or more scan lines and the one or more data lines; and at least one driver integrated circuit (IC) configured to provide a scan signal to the one or more scan lines during a time period corresponding to the image frame, and provide the image signal to the one or more data lines corresponding to the one or more scan lines through which the scan signal is provided.

BRIEF DESCRIPTION OF THE DRAWINGS

The above and other aspects, features, and advantages of embodiments of the disclosure will be more apparent from the following description taken in conjunction with the accompanying drawings, in which.

DETAILED DESCRIPTION

Figure 1:
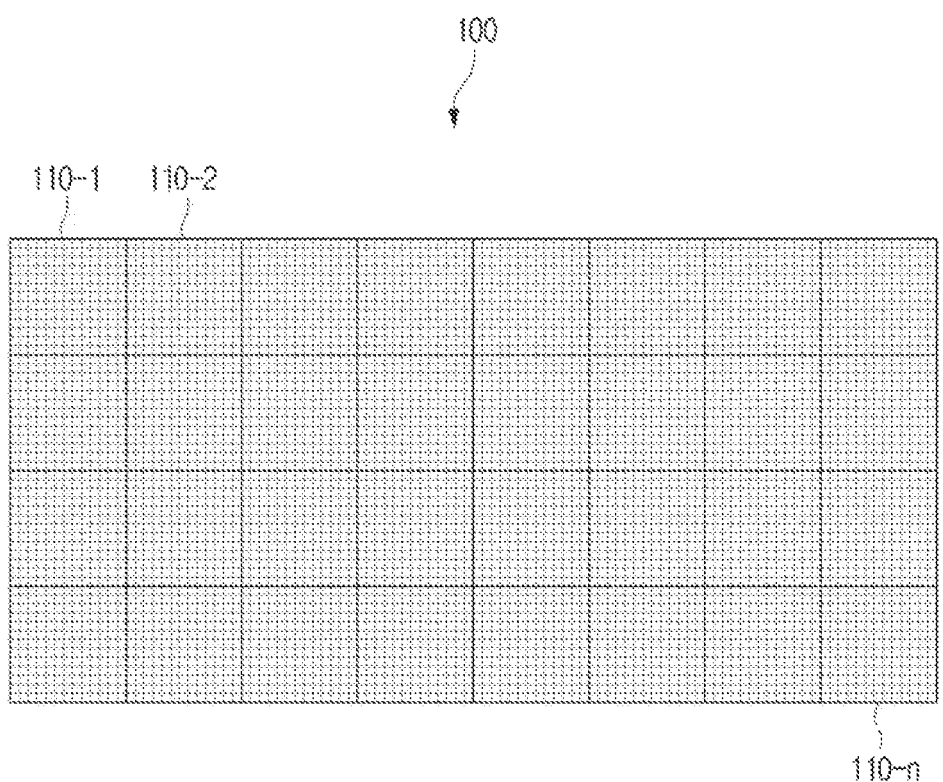
FIG. 1 is a diagram illustrating a modular display apparatus, according to one or more embodiments.

Terms used in the disclosure will be briefly described, and the disclosure will be described in detail.

The terms used in describing one or more embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and the meaning of the term will be disclosed in greater detail in the corresponding description. Accordingly, the terms used herein are not to be understood simply as its designation but based on the meaning of the term and the overall context of the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. In case it is determined that in describing the embodiments, detailed description of related known technologies may unnecessarily confuse the gist of the disclosure, the detailed description will be omitted.

Terms such as "first," and "second" may be used in describing the various elements, but the elements are not to be limited by the terms. The terms may be used only to distinguish one element from another.

A singular expression includes a plural expression, unless otherwise specified. It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The term "module" or "part" used in the embodiments herein perform at least one function or operation, and may be realized with a hardware or software, or realized with a combination of hardware and software. Further, a plurality of "modules" or a plurality of "parts," except for a "module" or a "part" which needs to be realized to a specific hardware, may be integrated to at least one module and realized in at least one processor.

In the disclosure, expressions "A or B," "least one of A and/or B," "one or more of A and/or B" and the like, may include all possible combinations of items enumerated together. For example, "A or B," "at least one of A and B" or "at least one of A or B" may indicate all of 1) a case where only A is included, 2) a case where only B is included, or 3) a case where both A and B are included.

Embodiments of the disclosure will be described in detail with reference to the accompanying drawings to aid in the understanding of those of ordinary skill in the art. However, the disclosure may be realized in various different forms and it should be noted that the disclosure is not limited to the various example embodiments described herein. Further, in the drawings, parts not relevant to the description may be omitted, and like reference numerals may be used to indicate like elements.

FIG. 1 is a diagram illustrating a modular display apparatus according to one or more embodiments.

A modular display apparatus 100 may include a plurality of display modules 110. Each of the display modules 110 may be physically connected and form one display.

The modular display apparatus 100 may be realized as a television (TV), but is not limited thereto. For example, the modular display apparatus 100 may be applicable without limitation so long as it is an apparatus that includes a display function such as, for example, and without limitation, a video wall, a large format display (LFD), a digital signage, a digital information display (DID), a projector display, and the like.

In addition, the plurality of display modules 110 may be respectively realized as displays of various forms such as, for example, and without limitation, a liquid crystal display (LCD), an organic light-emitting diode (OLED), a liquid crystal on silicon (LCoS), a digital light processing (DLP), a quantum dot (QD) display panel, a quantum dot light-emitting diodes (QLED) micro light-emitting diodes (μLED), a mini LED, and the like. The plurality of display modules 110 may respectively be realized as, for example, and without limitation, a touch screen coupled with a touch sensor, a flexible display, a rollable display, a 3-dimensional (3D) display, and the like.

Figure 2:
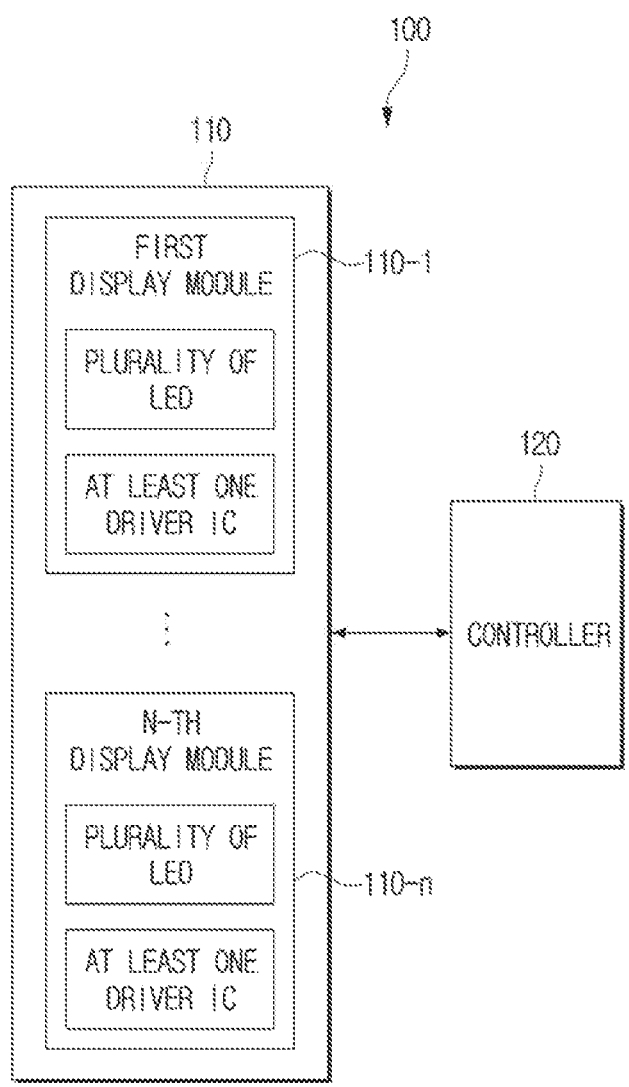
FIG. 2 is a block diagram illustrating a modular display apparatus, according to one or more embodiments.

FIG. 2 is a block diagram illustrating a modular display apparatus according to one or more embodiments.

The modular display apparatus 100 according to one or more embodiments may include the plurality of display modules 110, and the modular display apparatus 100 may display an image frame using the plurality of display modules 110.

For example, the modular display apparatus 100 may include the plurality of display modules 110 arranged in a matrix form (e.g., a 8×4 form). The 8×4 form is merely one embodiment for convenience of description, and arrangement forms, numbers, and the like of the plurality of display modules 110 that form the modular display apparatus 100 may be variously modified according to a specification of the modular display apparatus 100 (e.g., resolution, size, etc.), a manufacturing objective of a manufacturer, and the like.

The plurality of display modules 110 included in the modular display apparatus 100 according to one or more embodiments may respectively include a plurality of LEDs, and at least one driver IC.

The plurality of LEDs may be arranged in a matrix form. For example, a first display module 110-1 may include a plurality of scan lines and a plurality of data lines (or, plurality of channels), and the plurality of scan lines may be arranged in one direction (e.g., horizontal direction), and the plurality of data lines may be arranged in a direction perpendicular to the plurality of scan lines (e.g., vertical direction).

The plurality of LEDs arranged in the matrix form may be respectively generated at a cross area of the scan lines and the data lines.

In an example, the plurality of display modules 110 may respectively include a plurality of self-emissive devices. The self-emissive devices may be at least one from among a light emitting diode (LED) or a micro LED. The micro LED may be an LED of about 5 to 100 micrometer in size, and may be an ultra-small light emitting device that emits light on its own without a color filter.

According to an example, the plurality of display modules 110 may respectively operate in a passive matrix method.

The passive matrix method may be a method in which at least one driver IC is configured to sequentially provide a scan signal to the plurality of scan lines, and the at least one driver IC is configured to apply data to pixels corresponding to the scan line provided with the scan signal from among the plurality of scan lines using the plurality of data lines. The passive matrix method will be described below with reference to FIG. 3.

The modular display apparatus 100 according to one or more embodiments may include a controller 120.

The controller 120 according to an example may include at least one processor, and the at least one processor may control the overall operation of the modular display apparatus 100.

According to one or more embodiments, the at least one processor may be realized as a digital signal processor (DSP) that processes a digital signal, a microprocessor, or a timing controller (TCON). However, the above is not limited thereto, and may include one or more from among a central processing unit (CPU), a micro controller unit (MCU), a micro processing unit (MPU), a controller, an application processor (AP), or a communication processor (CP), an ARM processor, an artificial intelligence (AI) processor, or may be defined by the corresponding term. In addition, the at least one processor may be realized as a System on Chip (SoC) or a large scale integration (LSI) embedded with a processing algorithm, and may be realized in the form of a field programmable gate array (FPGA). The at least one processor may perform various functions by executing computer executable instructions stored in a memory.

The at least one processor may include at least one from among a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The at least one processor may control one or a random combination from among other elements of an electronic apparatus, and perform an operation associated with communication or data processing. The at least one processor may execute at least one program or instruction stored in the memory. For example, the at least one processor may perform, by executing at least one instruction stored in the memory, a method according to one or more embodiments of the disclosure.

When a method according to one or more embodiments of the disclosure include a plurality of operations, the plurality of operations may be performed by one processor, or performed by a plurality of processors. For example, when a first operation, a second operation, and a third operation are performed by a method according to one or more embodiments, the first operation, the second operation, and the third operation may all be performed by a first processor, or the first operation and the second operation may be performed by the first processor (e.g., a generic-purpose processor) and the third operation may be performed by a second processor (e.g., an artificial intelligence dedicated processor).

The at least one processor may be realized as a single core processor that includes one core, or as at least one multicore processor that includes a plurality of cores (e.g., a homogeneous multicore or a heterogeneous multicore). If the at least one processor is realized as a multicore processor, each of the cores included in the multicore processor may include a memory inside the processor such as a cache memory and an on-chip memory, and a common cache shared by the plurality of cores may be included in the multicore processor. In addition, each of the cores (or a portion from among the plurality of cores) included in the multicore processor may independently read and perform a program command for realizing a method according to one or more embodiments, or read and perform a program command for realizing a method according to one or more embodiments of the disclosure due to a whole (or a portion) of the plurality of cores being interconnected.

When a method according to one or more embodiments of the disclosure include a plurality of operations, the plurality of operations may be performed by one core from among the plurality of cores or performed by the plurality of cores included in the multicore processor. For example, when a first operation, a second operation, and a third operation are performed by a method according to one or more embodiments, the first operation, the second operation, and the third operation may all be performed by a first core included in the multicore processor, or the first operation and the second operation may be performed by the first core included in the multicore processor and the third operation may be performed by a second core included in the multicore processor.

According to one or more embodiments, the processor may refer to a system on chip (SoC), a single core processor, or a multicore processor in which the at least one processor and other electronic components are integrated or a core included in the single core processor or the multicore processor, and the core herein may be realized as the CPU, the GPU, the APU, the MIC, the NPU, the hardware accelerator, the machine learning accelerator, or the like, but the embodiments of the disclosure are not limited thereto.

Specifically, the at least one processor may perform processing of image data that includes a plurality of image frames. For example, the at least one processor may include an image decoder that performs decoding of image data, and may perform various processing such as, for example, and without limitation, scaling, noise filtering, frame rate conversion, resolution conversion and the like of the image data.

The controller 120 according to an example may include the timing controller (TCON).

Figure 3:
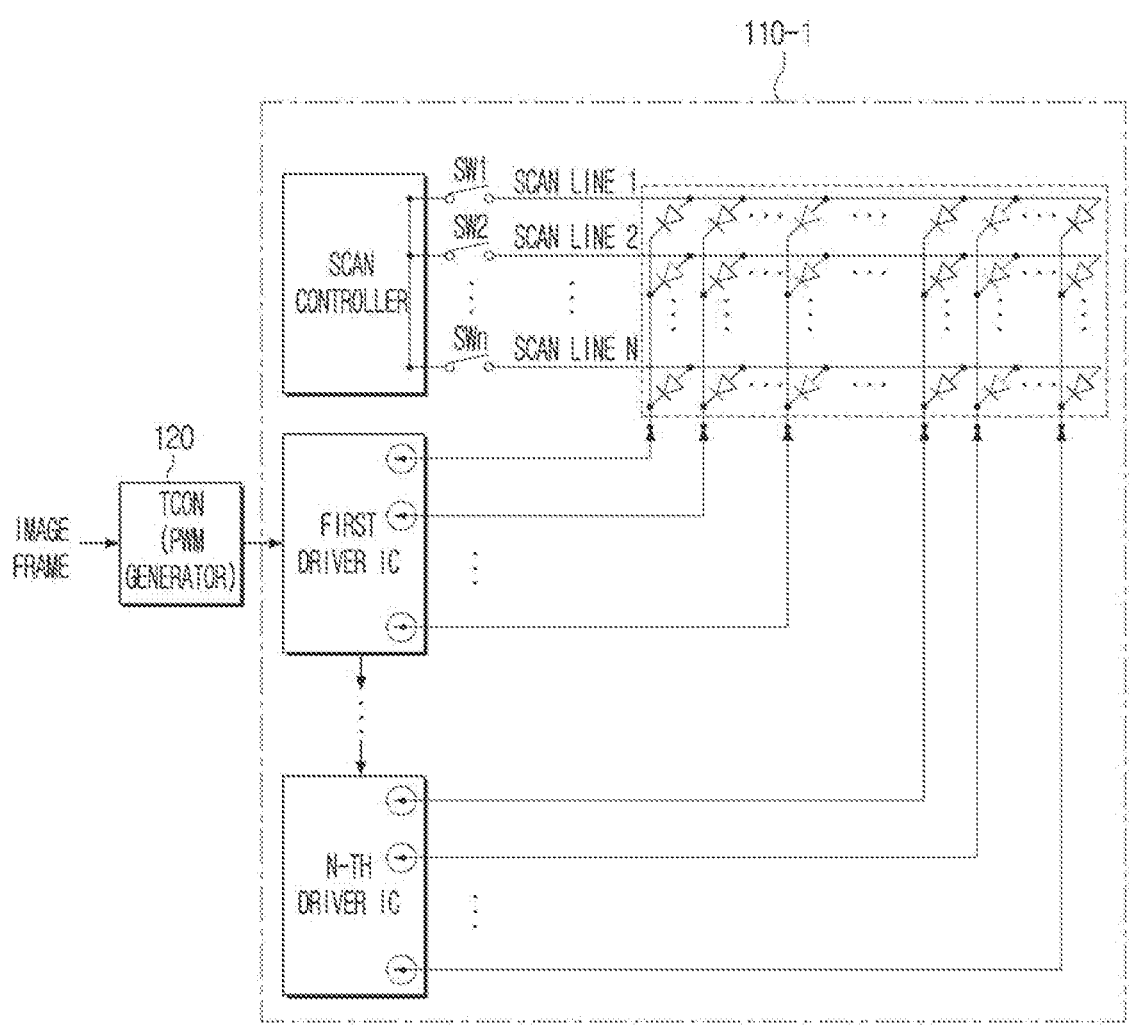
FIG. 3 is a diagram illustrating a detailed configuration of any one from among a plurality of display modules, according to one or more embodiments.

FIG. 3 is a diagram illustrating a detailed configuration of any one from among a plurality of display modules according to one or more embodiments.

FIG. 3 shows the first display module 110-1 and the controller 120 from among the plurality of display modules 110. For convenience of description, only the first display module 110-1 from among the plurality of display modules 110 has been shown, but is not limited thereto, and various examples of the plurality of display modules 110 herein may also be realized in the remaining display modules 110-2, . . . , 110-n.

The scan controller included in the first display module 110-1 according to an example may sequentially turn-on the plurality of scan lines (Scan line 1 to Scan line n) during a time period that corresponds to an image frame. The time period that corresponds to the image frame may be 1/60 (0.016) second if the frame rate corresponding to the image data is 60 Hz. However, this is one example, and the time period corresponding to the image frame may include a plurality of sub frame periods.

For example, if a time period corresponding to one image frame includes 64 sub frame periods, the scan controller may sequentially turn-on the plurality of scan lines during one sub frame period (e.g., 260.4 μsec), and turn-on each of the scan lines 64 times during the time period corresponding to the image frame.

For example, the scan controller may divide one sub frame period back into an n-number of periods (a number of the plurality of scan lines), turn-on a switch of a first scan line (Scan line 1) during a first period T1, and control the LEDs corresponding to the first scan line (Scan line 1) to emit light. A switch of the remaining scan lines (Scan line 2 to Scan line n) may be turned-off during the first period T1. In addition, when the first period T1 is ended and a second period T2 is started, the LEDs corresponding to a second scan line (Scan line 2) may be controlled to emit light by turning-off the switch of the first scan line (Scan line 1), and turning-on a switch of the second scan line (Scan line 2). A switch of the remaining scan lines (Scan line 1, and Scan line 3 to Scan line n) except for the second scan line (Scan line 2) may be turned-off even during the second period T2. By sequentially switching from the first scan line (Scan line 1) to the nth scan line (Scan line n) in a same method as described above, the whole pixels may all be configured to emit light during the sub frame period.

Referring to FIG. 3, the data lines of the plurality of scan lines (Scan line 1 to Scan line n), that is, the plurality of data lines may be configured so as to connect to at least one driver IC (e.g., a first driver IC to an nth driver IC), and if the plurality of scan lines are sequentially turned-on, the plurality of scan lines may be designated as a scan group. Each of the display modules 110 according to an example may include at least one scan group. In an example, the first display module 110-1 may include a plurality of scan groups, and the plurality of scan groups may be connected in a daisy chain method. The detailed description thereof will be provided below.

Referring to FIG. 3, because a number of data lines (or, number of channels) through which the driver IC is configured to drive during the time period corresponding to one image frame is limited, the scan group may drive the plurality of data lines within the scan group using at least one driver IC.

For example, the driver IC may drive 32 scan lines and 16 data lines during the time period corresponding to one image frame, and if the scan group includes 32 scan lines and 160 data lines, the scan group may be driven by at least 10 driver ICs. The first driver IC may drive a first data line to a sixteenth data line, and a second driver IC may drive a seventeenth data line to a thirty second data line, and a tenth driver IC may drive a one hundred forty fifth data line to a one hundred sixtieth data line.

The controller 120 according to an example may be configured to identify brightness of each of the pixels included in one scan group based on an image frame, and adjust a duty of a PWM signal based on the brightness of each of the pixels. The PWM signal may be referred to as an image signal, a driving signal, and the like, but will be collectively referred to as the PWM signal for convenience of description.

Further, the controller 120 may transmit the PWM signal to the first driver IC included in the first display module 110-1. The first driver IC according to an example may control a magnitude of current based on the received PWM signal, and adjust brightness of each of the pixels corresponding to the first driver IC within the scan group. For example, the first driver IC may adjust brightness of each of the pixels corresponding to the first driver IC through data lines connected to the first driver IC.

The controller 120 may transmit a PWM signal corresponding to the driver ICs included within the scan group, that is, each of the first driver IC to the tenth driver IC to the first driver IC. Because the driver ICs included within the scan group according to an example are connected according to the daisy chain method, the first driver IC may sequentially transmit the PWM signal received from the controller 120 to the remaining driver ICs (i.e., a second driver IC to an nth driver IC).

The nth driver IC may control a magnitude of current based on the PWM signal received from a nth-1 driver IC, and adjust brightness of each of the pixels corresponding to the nth driver IC within the scan group. For example, the nth driver IC may adjust brightness of each of the pixels corresponding to the nth driver IC through data lines connected to the nth driver IC.

Figure 4:
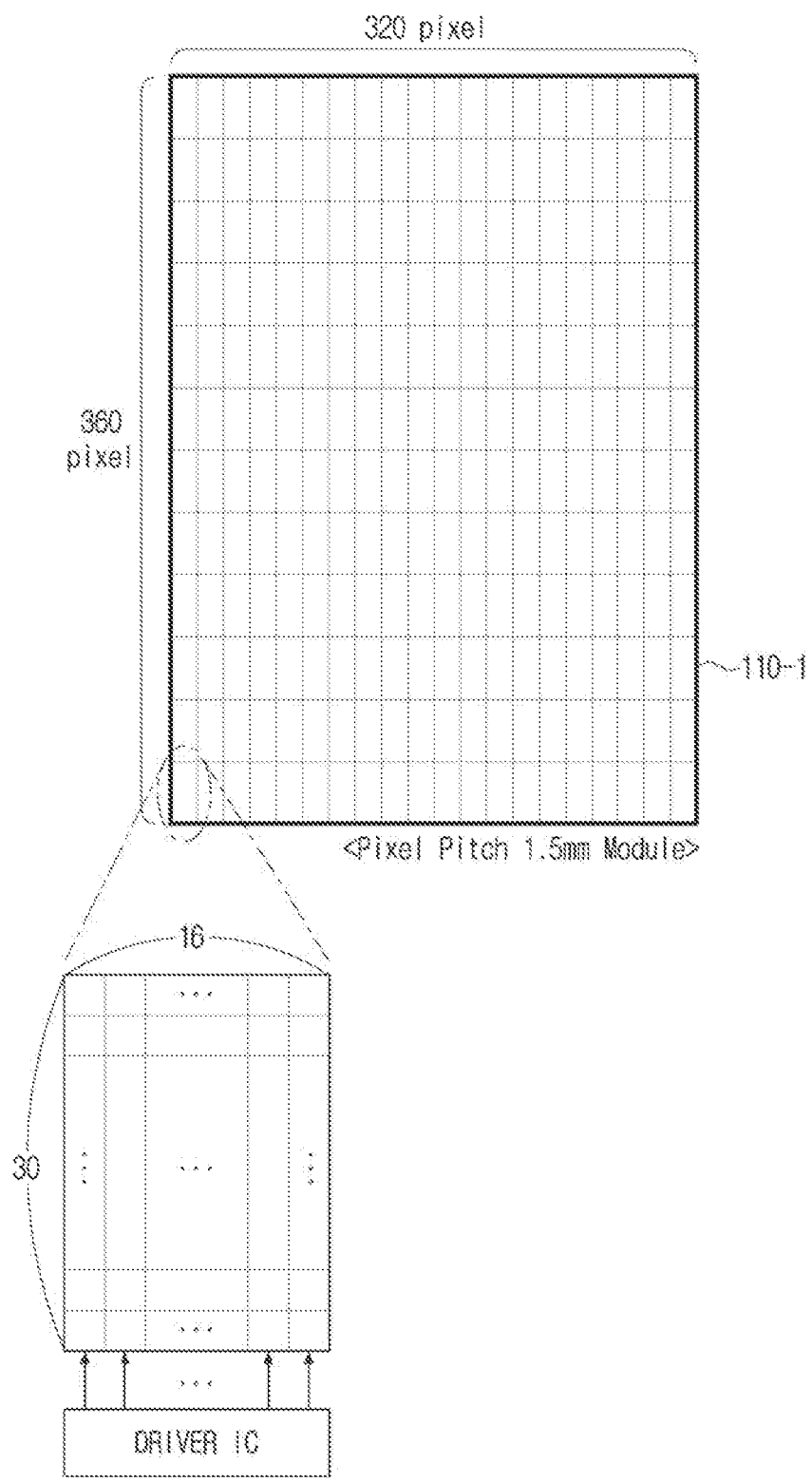
FIG. 4 is a diagram illustrating a modular display apparatus of a first pixel pitch, according to one or more embodiments.

FIG. 4 is a diagram illustrating a modular display apparatus of a first pixel pitch according to one or more embodiments.

Distance, e.g., a pixel pitch between the plurality of LEDs included in each of the display modules, according to one or more embodiments of the disclosure, may be variously modified according to a manufacturing objective of a manufacturer.

For example, one driver IC may drive 30 scan lines and 16 data lines during the time period corresponding to one image frame, and if the scan group includes 30 scan lines and 320 data lines, the one scan group may be driven by at least 20 driver ICs. The controller 120 may transmit a PWM signal that corresponds to each of the 20 driver ICs included in the scan group to the first driver IC (e.g., the driver IC to which the first data line to the sixteenth data line are connected).

Because the 20 driver ICs are connected in the daisy chain method, the first driver IC may transmit a PWM signal corresponding to each of the remaining 19 driver ICs to the second driver IC (e.g., the driver IC to which the seventeenth data line to the thirty second data line are connected).

If a resolution of the first display module 110-1 with a 1.5 mm pixel pitch is 320×360, the first display module 110-1 may include 12 scan groups.

Figure 5:
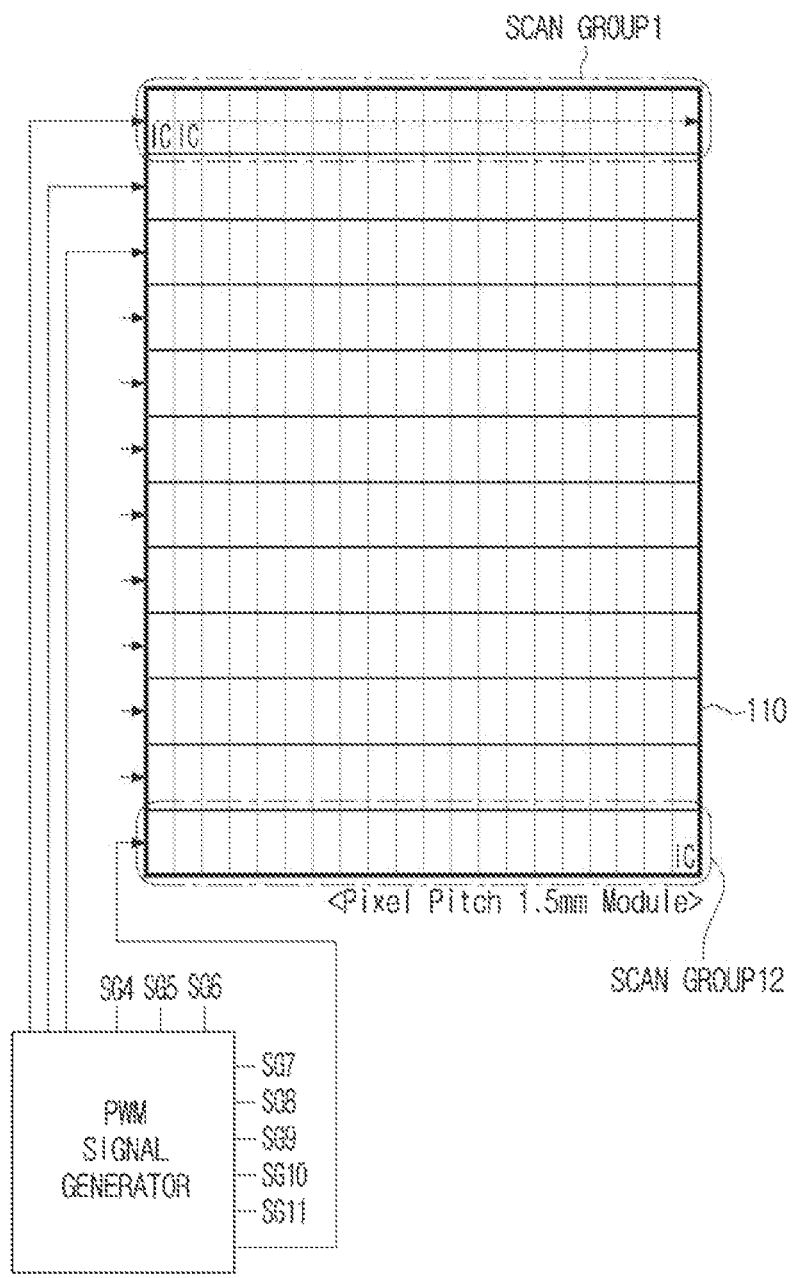
FIG. 5 is a diagram illustrating a plurality of scan groups included in a modular display apparatus of a first pixel pitch, according to one or more embodiments.

FIG. 5 is a diagram illustrating a plurality of scan groups included in a modular display apparatus of a first pixel pitch according to one or more embodiments.

Referring to FIG. 5, the controller 120 may be connected to each of the scan groups included in the first display module 110-1, and transmit the PWM signal to each of the scan groups.

For example, the first display module 110-1 may include the 12 scan groups, and transmit a PWM signal corresponding to each of the 20 driver ICs included in a first scan group (SCAN GROUP 1) to the first scan group (SCAN GROUP 1). The first driver IC from among the 20 driver ICs included in the first scan group may sequentially transmit the corresponding PWM signal to the remaining driver ICs (e.g., the second driver IC to a twentieth driver IC) connected according to the daisy chain method.

The controller 120 may include at least 12 pins to respectively connect to the plurality of scan groups (e.g., 12 scan groups) included in the first display module 110-1. If the controller 120 is realized as a FPGA including a plurality of pins, there may be a disadvantage of the manufacturing cost the controller 120 increasing as a number of pins increase, that is, the more it is realized as a high-performance FPGA.

Figure 6:
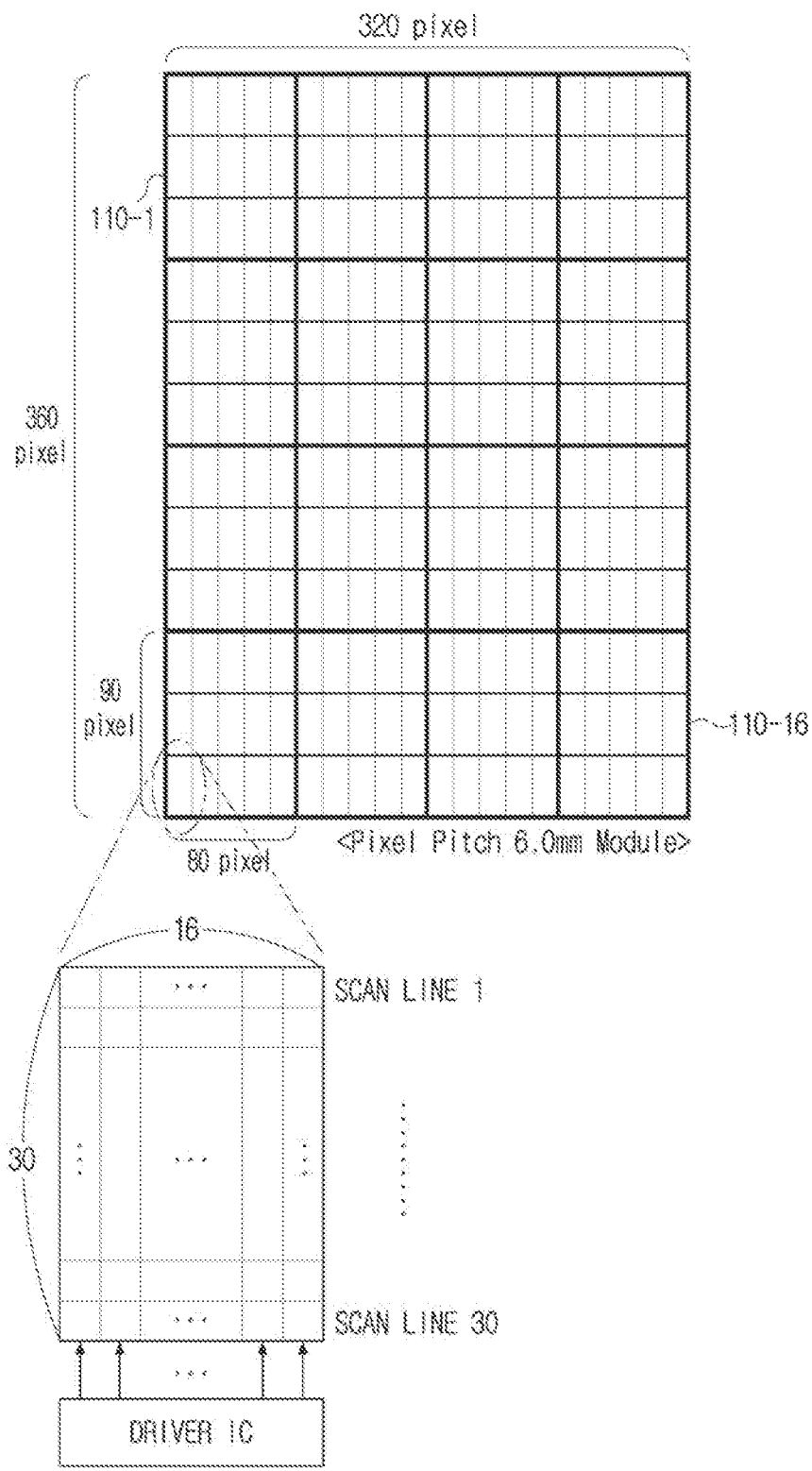
FIG. 6 is a diagram illustrating a modular display apparatus of a second pixel pitch, according to one or more embodiments.

The detailed description thereof will be provided with reference to FIG. 6.

FIG. 6 is a diagram illustrating a modular display apparatus of a second pixel pitch according to one or more embodiments.

Although a size of the display module is the same, a number of the plurality of LEDs mounted to a display module may decrease as the pixel pitch, that is, a distance between the plurality of LED devices mounted to the display module increases.

For example, as shown in FIG. 4 and FIG. 5, when the first display module 110-1 with the 1.5 mm pixel pitch includes 320×360 plurality of LEDs, the first display module 110-1 with a 6.0 mm pixel pitch may include 80×90 plurality of LEDs as shown in FIG. 6 in the same size display module.

If the pixel pitch increases from 1.5 mm to 6.0 mm, a resolution of the display module may decrease because the number of the plurality of LEDs mountable to the display module decreases.

As shown in FIG. 6, because the resolution of the first display module 110-1 is 80×90, the modular display apparatus 100 with a 320×360 resolution may be realized by arranging the first display module 110-1 to a sixteenth display module 110-16 in the matrix form (e.g., a 4×4 form). Specific numbers are merely one example provided for convenience of description and the above is not limited thereto. For example, the modular display apparatus 100 may include the plurality of display modules 110 of various numbers and various sizes, and may be realized as a High Definition (HD), a Full HD, an Ultra HD, or the modular display apparatus 100 with a sharper resolution than the Ultra HD.

Figure 7:
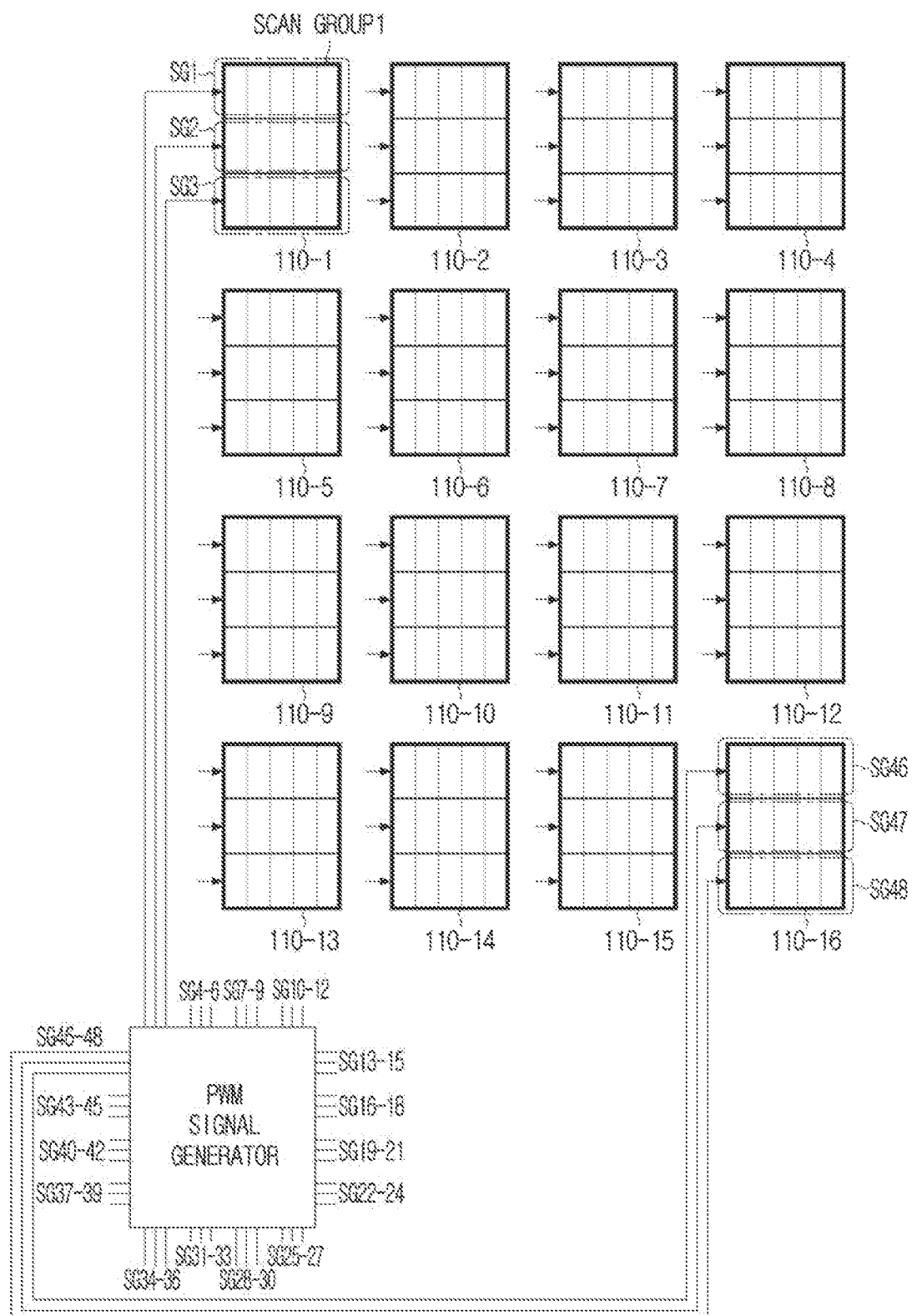
FIG. 7 is a diagram illustrating a plurality of scan groups included in a modular display apparatus of a second pixel pitch, according to one or more embodiments.

FIG. 7 is a diagram illustrating a plurality of scan groups included in a modular display apparatus of a second pixel pitch according to one or more embodiments.

Referring to FIG. 7, the controller 120 of the modular display apparatus 100 may be connected to each of the scan groups (e.g., a first scan group to a third scan group) included in the first display module 110-1, and transmit the PWM signal to plurality of scan groups, respectively.

For example, the first display module 110-1 may include 3 scan groups, and the controller 120 may transmit a PWM signal corresponding to each of 5 driver ICs included in the first scan group (SCAN GROUP 1) to the first driver IC of the first scan group (SCAN GROUP 1). The first driver IC from among the 5 driver ICs included in the first scan group may sequentially transmit the PWM signal corresponding to the remaining driver ICs (e.g., the second driver IC to a fifth driver IC) connected according to the daisy chain method.

The controller 120 may be connected to each of the scan groups (e.g., the first scan group to the third scan group) included in each of a second display module 110-2 to the sixteenth display module 110-16, and transmit the PWM signal to the plurality of scan groups, respectively.

For example, an nth display module 110-n may include 3 scan groups, and the controller 120 may transmit the PWM signal corresponding to each of the 5 driver ICs included in the first scan group (SCAN GROUP 1) to the first driver IC of the first scan group (SCAN GROUP 1). The first driver IC from among the 5 driver ICs included in the first scan group may sequentially transmit the PWM signal corresponding to the remaining driver ICs (e.g., the second driver IC to the fifth driver IC) connected according to the daisy chain method.

The controller 120 may transmit a PWM signal to each of the 12 scan groups included in the first display module 110-1 with the 1.5 mm pixel pitch and control the plurality of LEDs corresponding to the 320×360 resolution, but may control the plurality of LEDs corresponding to the 320×360 resolution by transmitting a PWM signal to the 3 scan groups, that is, to each of a total of 48 scan groups included in each of the first display module 110-1 to the sixteenth display module 110-16 with the 6.0 mm pixel pitch.

When comparing FIG. 5 and FIG. 7, because the required number of pins of the controller 120 (corresponding to the number of scan groups) is increased from 12 to 48, there is a need for the controller 120 to be realized with a high-performance and high-cost FPGA that includes a plurality of pins.

The plurality of scan groups included in each of the display modules 110 according to one or more embodiments may be connected with the daisy chain method. The detailed description thereof will be provided with reference to FIG. 8.

Figure 8:
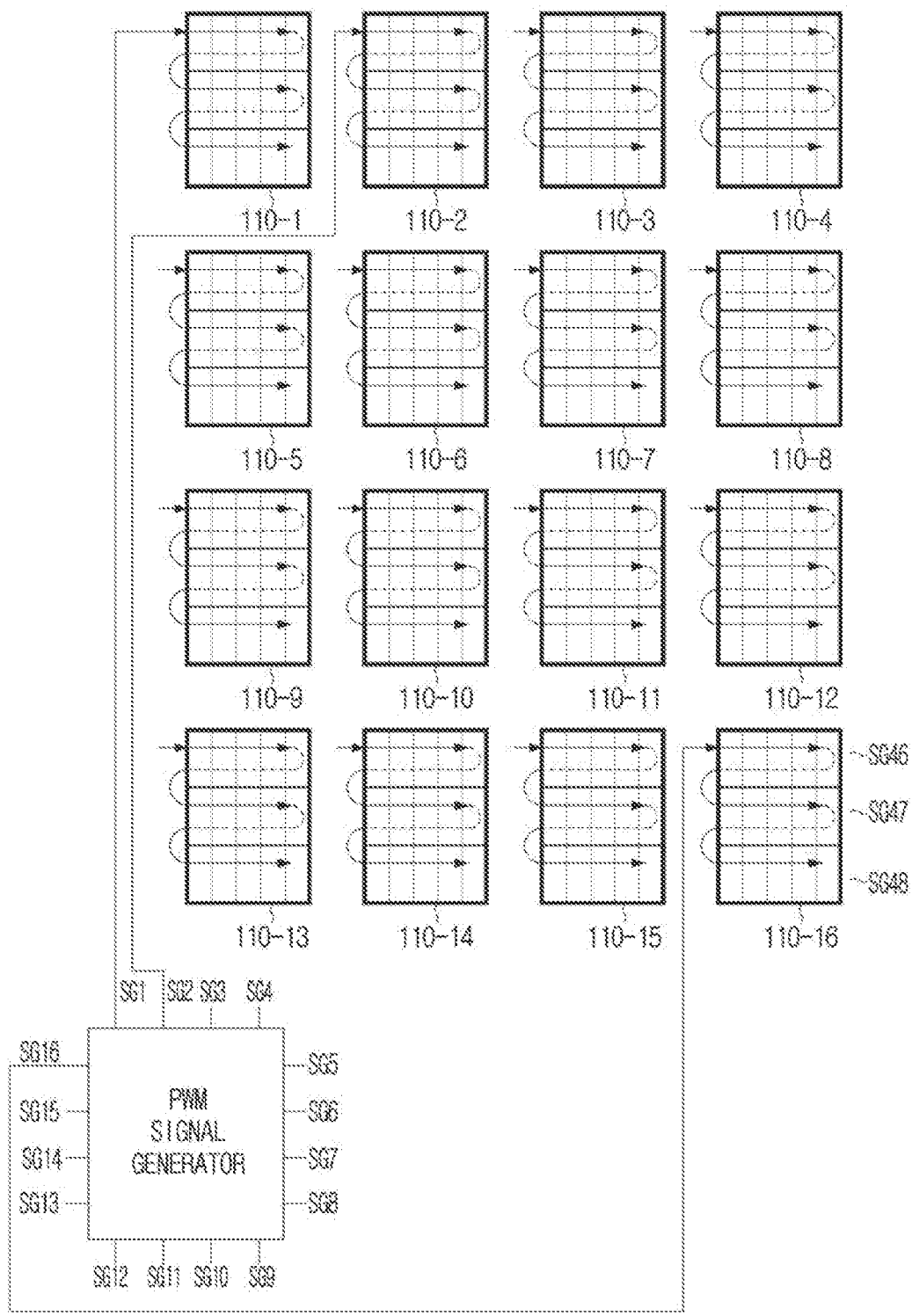
FIG. 8 is a diagram illustrating a plurality of scan groups connected in a daisy chain method, according to one or more embodiments.

FIG. 8 is a diagram illustrating a plurality of scan groups connected in a daisy chain method according to one or more embodiments.

Referring to FIG. 8, the controller 120 may obtain a PWM signal corresponding to the first display module 110-1. The PWM signal corresponding to the first display module 110-1 may a PWM signal buffered to correspond to a connection order of the plurality of scan groups (e.g., the first scan group to the third scan group) according to the daisy chain method included in the first display module 110-1. The detailed description thereof will be provided below.

For example, if the PWM signal corresponding to the first scan group included in the first display module 110-1 with the 1.5 mm pixel pitch is transmitted to the first scan group as shown in FIG. 5, the PWM signal corresponding to the first scan group may include a PWM signal corresponding to each of the 20 driver ICs included in the first scan group. The PWM signal corresponding to the first scan group may drive 320 data lines. That is, a size of the PWM signal corresponding to the first scan group that the controller 120 is configured to transmit to the first scan group may correspond to a bandwidth loadable by the controller 120 during the time period corresponding to the image frame or a maximum size of a signal transmittable by the controller 120 to the first driver IC included in the first scan group.

Unlike the above, when a PWM signal corresponding to the first scan group included in the first display module 110-1 with the 6.0 mm pixel pitch is transmitted to the first scan group as shown in FIG. 7, the PWM signal corresponding to the first scan group may include a PWM signal corresponding to each of the 5 driver ICs included in the first scan group. The PWM signal corresponding to the first scan group may drive 80 data lines. Accordingly, a size of the PWM signal corresponding to the first scan group that the controller 120 transmits to the first scan group may be less than a bandwidth loadable by the controller 120 from the memory stored with the image frame during the time period corresponding to the image frame, or less than a maximum size of a signal transmittable by the controller 120 to the first driver IC included in the first scan group.

The plurality of scan groups (e.g., the first scan group to the third scan group) included in the first display module 110-1 according to an example may be connected in the daisy chain method, and because the first scan group to the third scan group include a total of 15 driver ICs, 240 (=15*16) number of data lines may be driven.

As shown in FIG. 8, the controller 120 according to an example may transmit a PWM signal corresponding to the first display module 110-1, and the PWM signal corresponding to the first display module 110-1 may include a PWM signal corresponding to the first display module 110-1, a PWM signal corresponding to the first scan group, a PWM signal corresponding to a second scan group, and a PWM signal corresponding to the third scan group altogether.

The PWM signal corresponding to the first scan group may drive 240 data lines. Accordingly, a size of the PWM signal corresponding to the first scan group that the controller 120 transmits to the first scan group may be less than a bandwidth loadable by the controller 120 from the memory stored with the image frame during the time period corresponding to the image frame, or less than a maximum size of a signal transmittable by the controller 120 to the first driver IC included in the first scan group.

Referring to FIG. 8, because the controller 120 transmits the PWM signal to the first driver IC included in the first scan group and not transmit the PWM signal to the first driver IC included in each of the scan groups (the first scan group to the third scan group) included in the first display module 110-1, the PWM signal corresponding to each of the scan groups included in the first display module 110-1 may be transmitted using 1 pin.

For example, when comparing FIG. 7 and FIG. 8, because the required number of pins of the controller 120 (corresponding to the number of scan groups) is decreased from 48 to 16 when the PWM signal is transmitted to each of the display modules 110 included in the modular display apparatus 100 with the same 6.0 mm pixel pitch, the controller 120 may be realized with a relatively low-performance and low-cost FPGA.

Figure 9:
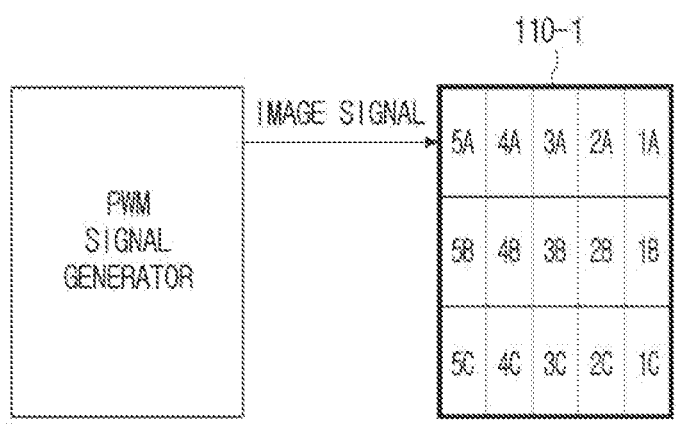
FIG. 9 is a diagram illustrating an image signal, according to one or more embodiments.
Figure 9:
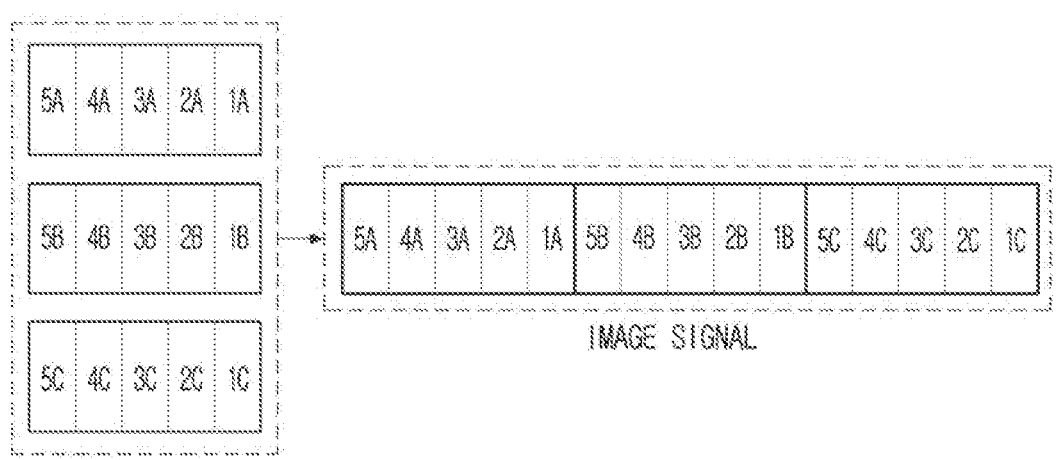

FIG. 9 is a diagram illustrating an image signal according to one or more embodiments.

Referring to FIG. 9, the controller 120 may transmit the PWM signal corresponding to the first display module 110-1 to the first display module 110-1.

As shown in FIG. 7, according to an embodiment, the controller 120 may transmit a PWM signal (1A→2A→3A→4A→5A) corresponding to each of the first driver IC to the fifth driver IC of the first scan group to the first driver IC of the first scan group included in the first display module 110-1. The PWM signal transmitted to the first driver IC of the first scan group by the controller 120 may be a PWM signal (1A→2A→3A→4A→5A) buffered to correspond to a connection order of the first driver IC to the fifth driver IC according to the daisy chain method.

In addition, the controller 120 may transmit a PWM signal (1B→2B→3B→4B→5B) corresponding to each of the first driver IC to the fifth driver IC of the second scan group to the first driver IC of the second scan group included in the first display module 110-1, and transmit a PWM signal (1C→2C→3C→4C→5C) corresponding to each of the first driver IC to the fifth driver IC of the third scan group to the first driver IC of the third scan group included in the first display module 110-1.

In the above-described example, at least 3 pins are required because the controller 120 is connected to each of the first scan group to the third scan group.

Because the plurality of scan groups included in the first display module 110-1 is connected in the daisy chain method according to an example, the controller 120 may obtain a PWM signal corresponding to the first display module 110-1 buffered to correspond to the connection order of the plurality of scan groups.

For example, the controller 120 may obtain a PWM signal corresponding to the first display module 110-1 by arranging the PWM signal corresponding to each of the driver ICs (e.g., 15 driver ICs) included in the first display module 110-1 in an order of a PWM signal 1C corresponding to the fifth driver IC of the third scan group→ . . . →a PWM signal 5C corresponding to the first driver IC of the third scan group→PWM signal 1B corresponding to the fifth driver IC of the second scan group→ . . . →a PWM signal 5B corresponding to the first driver IC of the second scan group→a PWM signal 1A corresponding to the fifth driver IC of the first scan group→ . . . →a PWM signal 5A corresponding to the first driver IC of the first scan group (i.e., 1C→2C→3C→4C→5C→1B→2B→3B→4B→5B→1A→2A→3A→4A→5A) taking into consideration i) the connection order according to the daisy chain method between the plurality of scan groups and ii) the connection order according to the daisy chain method between the driver ICs within the scan group.

The controller 120 may transmit the PWM corresponding to the first display module 110-1 to the first driver IC included in the first scan group included in the first display module 110-1.

Figure 10:
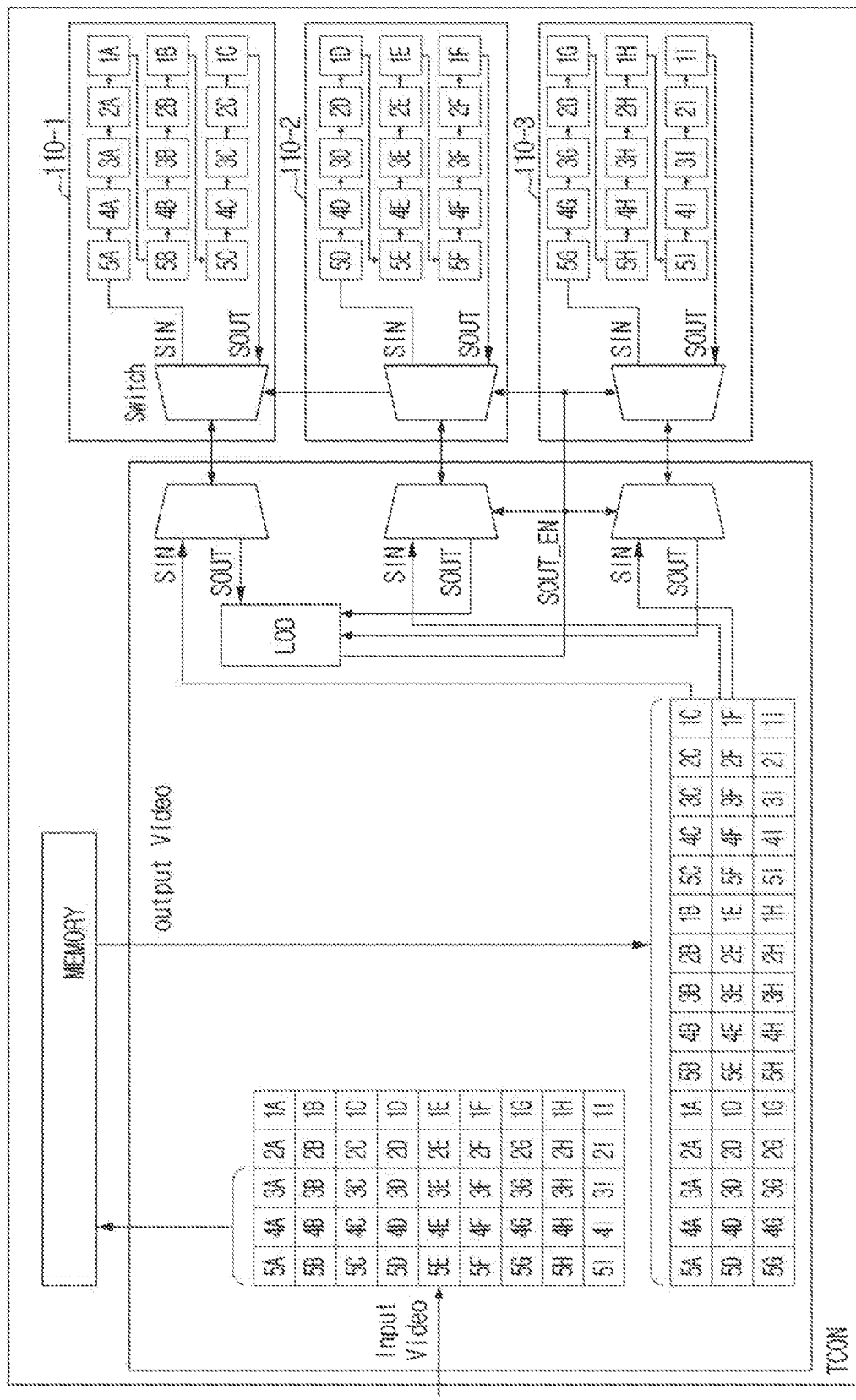
FIG. 10 is a diagram illustrating a switch IC, according to one or more embodiments.

FIG. 10 is a diagram illustrating a switch IC according to one or more embodiments.

Referring to FIG. 10, the controller 120 may obtain a PWM signal corresponding to the first display module 110-1, a PWM signal corresponding to the second display module 110-2, and a PWM signal corresponding to a third display module 110-3, respectively.

The controller 120 may transmit the PWM signal corresponding to the first display module 110-1 to the first driver IC included in the first scan group included in the first display module 110-1.

A driver IC (e.g., fifth driver IC) connected last according to the daisy chain method from among the driver ICs included in a scan group (e.g., third scan group) connected last according to the daisy chain method from among the plurality of scan groups included in the first display module 110-1 may transmit an output signal to the controller 120. For example, the fifth driver IC of the third scan group may transmit an output signal to the controller 120 when the PWM signal is received, and transmit an output signal to the controller 120 when an output request of the output signal is received from the controller 120.

The controller 120 may identify, based on the output signal being received, open LED information corresponding to the first display module 110-1 based on the output signal. The open LED information may include whether an error of the plurality of LEDs included in the first display module 110-1 occurred, whether an error of each of the driver ICs included in the first display module 110-1 occurred, and the like.

According to an example, because a driver IC (e.g., fifth driver IC) connected last according to the daisy chain method from among the driver ICs included in a scan group (e.g., third scan group) connected last according to the daisy chain method from among the plurality of scan groups transmits an output signal and not the fifth driver IC of the driver IC (e.g., first scan group) connected last according to the daisy chain method, the fifth driver IC of the second scan group, and the fifth driver IC of the third scan group from among the driver ICs included in each of the scan groups transmitting the output signal to the controller 120, there is an effect of the number of pins of the controller 120 required to receive the output signal from the first display module 110-1 reducing (3→1).

To this end, the controller 120 may include a multiplexer IC, and the first display module 110-1 may include the switch IC.

A multiplexer IC and a switch IC may be connected and a bidirectional communication between the controller 120 and the first display module 110-1 may be possible.

According to an example, the multiplexer IC may transmit a PWM signal corresponding to the first display module 110-1 to the switch IC. The switch IC may transmit, based on the PWM signal corresponding to the first display module 110-1 being received from the controller 120, the PWM signal to the first driver IC included in the first scan group from among the plurality of scan groups included in the first display module 110-1.

In addition, the switch IC may transmit, based on an output signal being received from the driver IC (e.g., fifth driver IC) connected last according to the daisy chain method from among the driver ICs included in a scan group (e.g., third scan group) connected last according to the daisy chain method from among the plurality of scan groups, the output signal to the controller 120. The multiplexer IC may transmit, based on the output signal being received from the switch IC, the output signal to the TCON included in the controller 120.

Referring back to FIG. 2, the modular display apparatus 100 according to one or more embodiments of the disclosure may further include a memory.

The memory according to one or more embodiments may store data necessary for the various embodiments of the disclosure. The memory may be realized in a memory form embedded to the modular display apparatus 100 according to data storage use, or realized in a memory form attachable to or detachable from the modular display apparatus 100.

For example, data for the driving of the modular display apparatus 100 may be stored in a memory embedded to the modular display apparatus 100, and data for an expansion function of the modular display apparatus 100 may be stored in a memory attachable to and detachable from the modular display apparatus 100. The memory embedded in the modular display apparatus 100 may be realized as at least one from among a volatile memory (e.g., a dynamic random access memory (DRAM), a static RAM (SRAM), or a synchronous dynamic RAM (SDRAM)), or a non-volatile memory (e.g., one time programmable read only memory (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard disk drive (HDD) or a solid state drive (SSD)). In the case of the memory attachable to and detachable from the modular display apparatus 100, the memory may be realized in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., USB memory) connectable to a USB port (e.g., USB memory), or the like.

The memory according to an example may store at least one instruction or a computer program including the instructions for controlling the modular display apparatus 100.

Specifically, the memory may store image data which includes the plurality of image frames.

Figure 11:
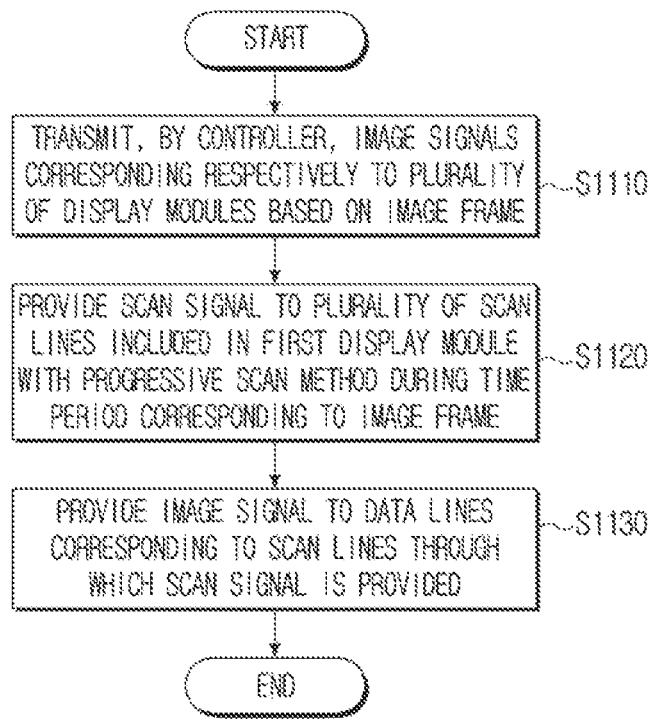
FIG. 11 is a diagram illustrating a control method of a modular display apparatus, according to one or more embodiments.

FIG. 11 is a flowchart illustrating a control method of a modular display apparatus according to one or more embodiments.

A control method of the modular display apparatus formed of the plurality of display modules according to an example may include, first, transmitting, by the controller, image signals corresponding respectively to the plurality of display modules based on an image frame (S1110).

A scan signal is provided, by the at least one driver IC, to the plurality of scan lines included in the first display module with a progressive scan method during the time period corresponding to the image frame (S1120).

An image signal is provided, by the at least one driver IC, to the data line corresponding to the scan line through which the scan signal is provided from among the plurality of data lines arranged in a direction perpendicular to the plurality of scan lines (S1130).

The plurality of scan groups included in each of the display modules may be connected in the daisy chain method.

According to an example, step S1110 of transmitting the image signal may include obtaining an image signal corresponding to the first display module from an image frame and transmitting the image signal corresponding to the first display module, and the image signal corresponding to the first display module may be buffered to correspond to the connection order of the plurality of scan groups according to the daisy chain method included in the first display module.

According to an example, the transmitting the image signal corresponding to the first display module may include transmitting the image signal to the at least one driver IC included in the first scan group from among the plurality of scan groups included in the first display module and transmitting, by the at least one driver IC included in the first scan group, the image signal to the at least one driver IC included in the second scan group included in the first display module according to the daisy chain method.

The size of the image signal corresponding to each of the display modules according to an example may correspond to a bandwidth loadable during the time period corresponding to the image frame by the controller.

The control method according to an example may further include the at least one driver IC included in the scan group connected last according to the daisy chain method from among the plurality of scan groups included in the first display module from among the plurality of display modules transmitting an output signal to the controller and identifying open LED information corresponding to the first display module based on the output signal.

The plurality of display modules may respectively include the switch IC, and the transmitting the image signal may include receiving an image signal corresponding to the first display module from the controller by the switch IC included in the first display module and transmitting the image signal to the at least one driver IC included in the first scan group from among the plurality of scan groups included in the first display module, and the transmitting the output signal may include transmitting the output signal to the controller based on the output signal being received from the at least one driver IC included in the scan group connected last from among the plurality of scan groups included in the first display module by the switch IC included in the first display module.

The controller may include the multiplexer IC, the transmitting the image signal may include transmitting the image signal corresponding to the first display module to the switch IC by the multiplexer IC, and the identifying open LED information may include receiving an output signal from the switch IC by the multiplexer IC and identifying open LED information corresponding to the first display module based on the output signal.

The identifying open LED information according to an example may include identifying whether an error of the plurality of LEDs included in the first display module occurred based on the open LED information.

The transmitting the image signal according to an example may include transmitting the image signal corresponding to the second display module to the at least one driver IC included in the scan group connected first according to the daisy chain method from among the plurality of scan groups included in the second display module from among the plurality of display modules, and the control method according to an example may further include receiving the output signal corresponding to the second display module from the at least one driver IC included in the scan group connected last according to the daisy chain method from among the plurality of scan groups included in the second display module.

However, the various embodiments of the disclosure may be applicable to not only electronic apparatuses, but also to all types of electronic apparatuses that include the display.

The various embodiments described above may be realized in a recordable medium which is readable by a computer or a device similar to the computer using software, hardware, or the combination of software and hardware. In some cases, embodiments described herein may be realized by the processor itself. According to a software implementation, embodiments such as the procedures and functions described herein may be realized with a separate software. The respective software may perform one or more functions and operations described herein.

The computer instructions for performing processing operations in an electronic apparatus according to the various embodiments described above may be stored in a non-transitory computer-readable medium. The computer instructions stored in this non-transitory computer-readable medium may cause a specific device to perform a processing operation from an electronic apparatus according to the above-described various embodiments when executed by a processor of the specific device.

The non-transitory computer readable medium may refer to a medium that stores data semi-permanently rather than storing data for a very short time, such as a register, a cache, a memory, or the like, and is readable by a device. Specific examples of the non-transitory computer readable medium may include, for example, and without limitation, a compact disc (CD), a digital versatile disc (DVD), a hard disc, a Blu-ray disc, a USB, a memory card, a ROM, and the like.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A modular display apparatus, comprising:
a plurality of display modules; and
a controller configured to control the plurality of display modules,
wherein the plurality of display modules comprise a plurality of scan groups, respectively,
wherein the controller is configured to:
transmit an image signal corresponding to the respective display modules based on an image frame,
wherein the respective scan groups comprised in a first display module from among the plurality of display modules, comprise:
a plurality of scan lines arranged in one direction;
a plurality of data lines arranged in a direction perpendicular to the plurality of scan lines;
light emitting diodes (LEDs) generated at a cross area of the scan lines and the data lines; and
at least one driver integrated circuit (IC) configured to provide a scan signal to the plurality of scan lines with a progressive scan method during a time period corresponding to the image frame, and provide the image signal to the data lines corresponding to the scan lines through which the scan signal is provided,
wherein the plurality of scan groups comprised in the first display module is connected in a daisy chain method,
wherein at least one driver IC comprised in a scan group connected last according to the daisy chain method from among the plurality of scan groups comprised in the first display module is configured to transmit an output signal to the controller,
wherein the controller is further configured to:
identify open LED information corresponding to the first display module based on the output signal, and
identify whether an error of each of the at least one driver ICs included in the first display module occurs based on the open LED information, and
wherein a first driver IC, from among the at least one driver IC of a first scan group, is configured to sequentially transmit a pulse width modulation (PWM) signal received from the controller to a second driver IC, from among the at least one driver IC of a second scan group, and to other remaining driver ICs.

2. The modular display apparatus of claim 1, wherein the controller is further configured to:
obtain an image signal corresponding to the first display module from the image frame,
transmit the corresponding image signal to the first display module,
wherein the image signal corresponding to the first display module is buffered to correspond to a connection order of the plurality of scan groups according to the daisy chain method comprised in the first display module.

3. The modular display apparatus of claim 2, wherein the controller is further configured to:
transmit the image signal to at least one driver IC comprised in the first scan group from among the plurality of scan groups comprised in the first display module.

4. The modular display apparatus of claim 1, further comprising:
a memory configured to store the image frame,
wherein a size of an image signal corresponding to the first display module corresponds to a bandwidth loadable by the controller during a time period corresponding to the image frame from the memory.

5. The modular display apparatus of claim 1, wherein the first display module comprises:
a switch IC configured to:
connect with the controller,
transmit, based on the image signal corresponding to the first display module being received from the controller, the image signal to the at least one driver IC comprised in the first scan group from among the plurality of scan groups comprised in the first display module, and transmit, based on the output signal being received from the at least one driver IC comprised in the scan group connected last from among the plurality of scan groups, the output signal to the controller.

6. The modular display apparatus of claim 5, wherein the controller comprises a multiplexer IC, and
wherein the multiplexer IC is configured to:
connect with the switch IC, and
transmit an image signal corresponding to the first display module to the switch IC, or receive the output signal from the switch IC.

7. The modular display apparatus of claim 1, wherein the controller is configured to identify whether an error of one or more LEDs included in the first display module occurs based on the open LED information.

8. The modular display apparatus of claim 1, wherein the controller is further configured to:
transmit an image signal corresponding to a second display module to at least one driver IC comprised in a scan group connected first according to the daisy chain method from among the plurality of scan groups comprised in the second display module from among the plurality of display modules, and
receive an output signal corresponding to the second display module from the at least one driver IC comprised in the scan group connected last according to the daisy chain method from among the plurality of scan groups comprised in the second display module.

9. A control method of a modular display apparatus formed of a plurality of display modules, the control method comprising:
transmitting an image signal corresponding to the plurality of display modules, respectively, based on an image frame by a controller;
providing a scan signal to a plurality of scan lines comprised in a first display module with a progressive scan method during a time period corresponding to the image frame by at least one driver integrated circuit (IC); and
providing the image signal to data lines corresponding to scan lines through which the scan signal is provided from among a plurality of data lines arranged in a direction perpendicular to the plurality of scan lines by the at least one driver IC,
wherein a plurality of scan groups comprised in the plurality of display modules, respectively, is connected in a daisy chain method,
wherein at least one driver IC comprised in a scan group connected last according to the daisy chain method from among the plurality of scan groups comprised in the first display module transmits an output signal to the controller, and
wherein the control method further comprises:
identifying open LED information corresponding to the first display module based on the output signal, and
identifying whether an error of each of the at least one driver ICs included in the first display module occurs based on the open LED information, and
wherein the control method further comprises sequentially transmitting a pulse width modulation (PWM) signal, from a first driver IC, from among the at least one driver IC of a first scan group, to a second driver IC, from among the at least one driver IC of a second scan group, and to other remaining driver ICs.

10. The control method of claim 9, wherein the transmitting the image signal comprises:
obtaining an image signal corresponding to the first display module from the image frame; and
transmitting the image signal corresponding to the first display module,
wherein the image signal corresponding to the first display module is buffered to correspond to a connection order of the plurality of scan groups according to the daisy chain method comprised in the first display module.

11. The control method of claim 10, wherein the transmitting the image signal corresponding to the first display module comprises:
transmitting the image signal to the at least one driver IC comprised in the first scan group from among the plurality of scan groups comprised in the first display module.

12. The control method of claim 9, wherein a size of an image signal corresponding to the plurality of display modules, respectively, corresponds to a bandwidth loadable by the controller during a time period corresponding to the image frame.

13. The control method of claim 9, wherein the plurality of display modules respectively comprise a switch integrated circuit (IC), and
wherein the transmitting the image signal comprises:
receiving an image signal corresponding to the first display module from the controller by the switch IC comprised in the first display module; and
transmitting the image signal to the at least one driver IC comprised in the first scan group from among the plurality of scan groups comprised in the first display module,
wherein the transmitting the output signal comprises:
transmitting, based on the output signal being received from the at least one driver IC comprised in the scan group connected last from among the plurality of scan groups comprised in the first display module by the switch IC comprised in the first display module, the output signal to the controller.

14. A display apparatus, comprising:
a controller configured to control one or more display modules,
wherein the one or more display modules include one or more scan groups,
wherein the controller is configured to:
provide an image signal corresponding to the one or more display modules based on an image frame,
wherein the one or more scan groups included in a first display module from among the one or more display modules, comprise:
one or more scan lines arranged in one direction;
one or more data lines arranged in a direction perpendicular to the one or more scan lines;
one or more light emitting diodes (LEDs) generated at a cross area of the one or more scan lines and the one or more data lines; and
at least one driver integrated circuit (IC) configured to provide a scan signal to the one or more scan lines during a time period corresponding to the image frame, and provide the image signal to the one or more data lines corresponding to the one or more scan lines through which the scan signal is provided,
wherein at least one driver IC comprised in a scan group connected last according to a daisy chain method from among a plurality of scan groups comprised in the first display module is configured to transmit an output signal to the controller, wherein the controller is further configured to:

identify open LED information corresponding to the first display module based on the output signal, and identify whether an error of each of the at least one driver ICs included in the first display module occurs based on the open LED information, and wherein a first driver IC, from among the at least one driver IC of a first scan group, is configured to sequentially transmit a pulse width modulation (PWM) signal received from the controller to a second driver IC, from among the at least one driver IC of a second scan group, and to other remaining driver ICs.

15. The display apparatus of claim 14, wherein the controller is further configured to:

obtain an image signal corresponding to the first display module from the image frame, provide the corresponding image signal to the first display module, wherein the image signal corresponding to the first display module is buffered to correspond to a connection order of the one or more scan groups according to a daisy chain method included in the first display module.

16. The display apparatus of claim 15, wherein the controller is further configured to:

provide the image signal to the at least one driver IC included in the first scan group from among the one or more scan groups included in the first display module.

17. The display apparatus of claim 14, further comprising:

at least one memory configured to store the image frame, wherein a size of an image signal corresponding to the first display module corresponds to a bandwidth loadable by the controller during a time period corresponding to the image frame from the at least one memory.

* * * * *